Sept. 11, 1934.    E. W. SWARTWOUT    1,973,299
VEHICLE SIGNAL
Filed June 13, 1929    2 Sheets-Sheet 1
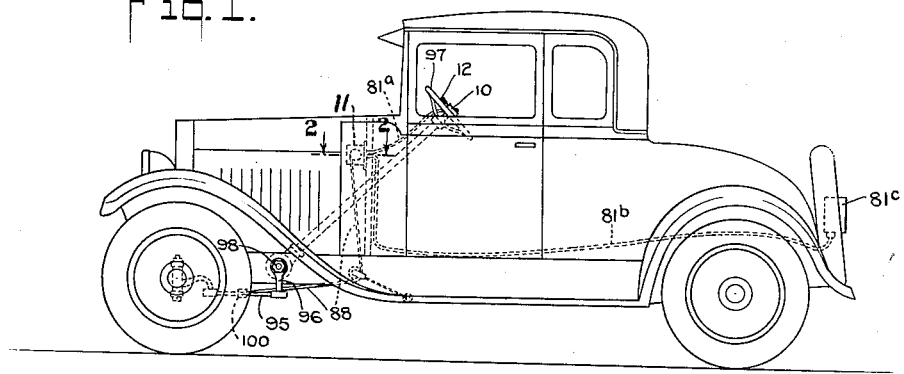
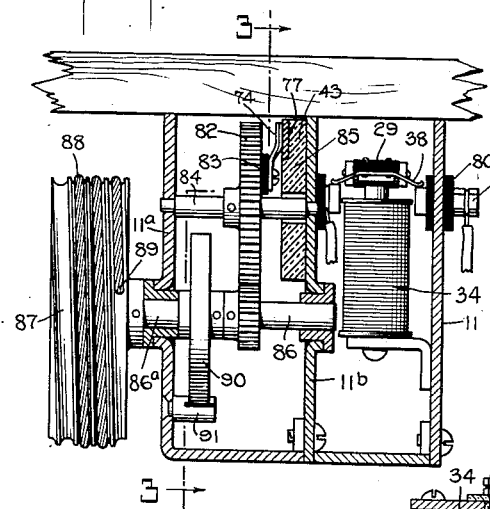
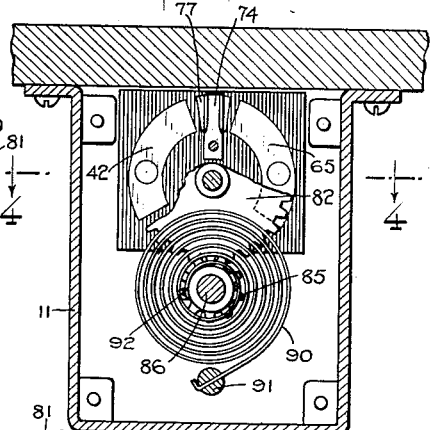
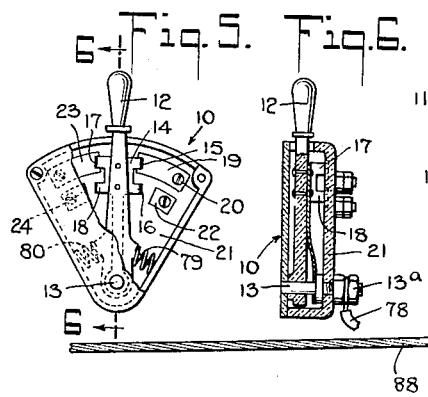
INVENTOR
Everett W. Swartwout
BY
ATTORNEY.

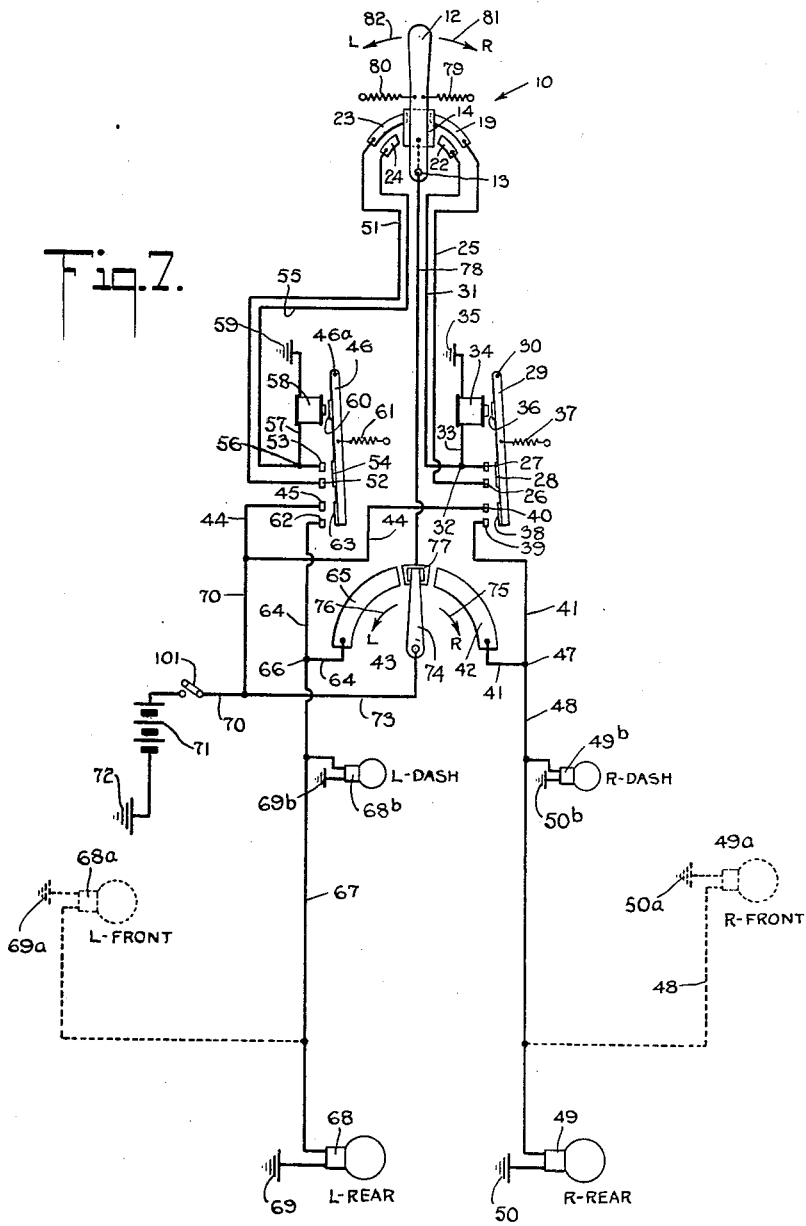

Patented Sept. 11, 1934

1,973,299

UNITED STATES PATENT OFFICE 1,973,299

VEHICLE SIGNAL

Everett W. Swartwout, White Plains, N. Y.

Application June 13, 1929, Serial No. 370,521

1 Claim. (Cl. 177—339)

This invention relates to vehicle signals, and particularly to lateral course signals of electrical or other means for affording pre-setting of the signal, manually or otherwise, in advance of automatic setting of the signal upon movement of the steering mechanism.

My invention is applicable to automobiles, motor boats, bicycles, and also to airplanes, dirigibles and other types of transportation bodies.

The preferred forms of my invention embody the features of providing for the movement of the steering beyond a predetermined arc.

Pursuant to the present invention the operation of the "right" and "left" lateral course signals or indicators is effected by means of a manually operated switch, electrically controlling the signals or indicators. The more preferred form of my invention embodies the signal hand switch, arranged to be conveniently located on the steering column or otherwise closely adjacent the driver.

My invention also provides for the assembly of the switches or equivalent, operated by the manual switch and the steering, at any suitable location on the chassis or body of the vehicle, with provision of means adapting the operation of the same by the steering independently of the ratio of gearing between the movement of the steering wheel and the extent of movement of the vehicle.

My invention is in part an improvement of that set forth in my U. S. Patent No. 1,365,127, dated Jan. 11, 1921, and in part an improvement of my co-pending applications Ser. No. 436,455, filed Jan. 11, 1921, now U. S. Patent No. 1,749,168, granted March 4, 1930, and Ser. No. 659,313, filed Aug. 25, 1923, now U. S. Patent No. 1,749,169, granted March 4, 1930.

Further features and objects of the invention will be more fully understood from the following detail description of the accompanying drawings, in which Fig. 1 is a side elevation of an automobile equipped with one embodiment of my invention and illustrates particularly the respective locations of certain parts of the assembly;

Fig. 2 is a central vertical section on enlarged scale, of the box containing the switch controlled by the steering gear and the respective contacts for the "right" and "left" course indications; the indicated wood at the top of Fig. 2 is a portion of the dash positioned vertically in the automobile, and is a section on line 2—2 of Fig. 1.

Fig. 3 is a sectional elevation on line 3—3 of Fig. 2;

Fig. 4 is a sectional elevation on line 4—4 of Fig. 3;

Fig. 5 is an elevation on the hand switch, on an enlarged scale, partly broken away;

Fig. 6 is a sectional elevation on line 6—6 of Fig. 5; and

Fig. 7 is a diagram of the circuit connections of the above stated parts and the indicating lamps as embodied in Fig. 1.

Referring to Fig. 1, the hand switch is indicated generally at 10. At 11 is indicated the closed casing for the electro-magnets and controlled contacts associated with the hand switch, and the contacts associated with the steering mechanism. The manual switch 10 appears in detail in Figs. 5 and 6, and the casing 11 and enclosed elements in detail in Figs. 2, 3 and 4.

Referring now to diagram shown in Fig. 7, the hand lever 12 of the manual switch 10 is suitably pivoted at 13, as by means of a pin of conducting material, serving also as a terminal, for which purpose it is provided with the binding nut 13a. The shank of the hand lever 12 carries the bridging contact member 14, preferably having wiping terminals 15, 16 at one side and the wiping terminals 17, 18 at the opposite side.

The terminal 15 is associated with the upper "right" arcuate contact 19 suitably secured by screws 20 to the rear wall 21 of electrically insulating material. The terminal 16 is associated with the lower "right" arcuate contact 22 also suitably secured to the electrically insulating wall 21.

The terminal 17 is associated with the upper "left" arcuate contact 23 suitably secured to the electrically insulating wall 21, and the terminal 18 is associated with the lower "left" arcuate contact 24, also suitably fixed and insulated.

The upper "right" and "left" contacts 19, 23, are relatively long and are spaced apart from one another a predetermined distance, and the lower "right" and "left" contacts are relatively short and spaced apart from one another a determined distance, to provide a clearance in which the terminals 16, 18 are free of both contacts 22, 24.

Such terminals 15, 17, 16, 18, are in electrical connection with one another and parts of or connected to the bridging member 14.

The upper "right" contact 19, see Fig. 7, is connected by the conductor 25 to the terminal 26, which is associated with the terminal 27 and the moving bridge contact 28, shown mounted on the pivot arm 29, pivoted at 30. The contact 27 is connected by the conductor 31 to the "right" lower contact 22. To the conductor 31 at 32 is connected the lead 33 to one terminal of the winding of the electro-magnet 34, the opposite terminal being grounded, as indicated at 35. The armature 36 for the electromagnet 34 is mounted upon the movable lever 29, whereby upon excitation of the electromagnet 34 and the consequent attraction of its armature 36, the contact lever 29 is moved against its biasing retractile spring 37 to bridge the contact 28 with the terminals 26, 27, as will appear more fully hereinafter.

Upon the pivoted lever 29 is also mounted the bridging contact 38 associated with the terminals 39, 40. The terminal 39 is connected by the conductor 41 to the arcuate contact 42 of the switch 43, which is operated by the steering mechanism as will appear more fully hereinafter. The terminal 40 is connected by the conductor 44 to the contact 45 of the "left" movable contact lever 46, referred to hereinafter. At 47 the conductor 48 is connected to the conductor 41 and leads to one or more suitable course indicating lamps or equivalent course indicator, such as the rear "right" lamp 49 and thence to ground 50, and/or a front "right" indicating lamp 49a and thence to ground 50a, and/or a "right" indicating lamp 49b located at the dash or other desired position and grounded as indicated at 50b.

The upper "left" arcuate contact 23 of the manual switch 10 is connected by the conductor 51 to the contact 52 associated with the contact 53 and bridging contact 54 mounted on the "left" contact lever 46. The contact 53 is connected by the conductor 55 to the lower "left" contact 24 of the manual switch 10. At 56 the conductor 57 is connected to the conductor 55 leading to one terminal of the electromagnet 58, the opposite terminal of which is grounded at 59. The armature 60, mounted on the "left" contact lever 46, is associated with the electromagnet 58. The left contact lever is biased to open position by its retractile spring 61, and suitably pivoted at 46a. The terminal 45 is associated with the contact 62 and bridging contact 63 carried by the "left" contact lever 46. The terminal 62 is connected by the conductor 64 to the "left" arcuate contact 65 of the switch 43, controlled by the steering mechanism. The conductor 64 is connected at 66 to the conductor 67 leading to the rear "left" indicating lamp 68, or equivalent direction course indicator, grounded at 69 and/or to the "left" direction course indicator 68a grounded at 69a and/or to the dash "left" indicator 68b grounded at 69b.

The conductor 44 connecting the contact 40 of the right hand contact lever 29 with the contact 45 of the "left" contact lever 46 is also connected by the conductor 70 to one terminal of the storage or other battery 71, the opposite terminal of which is grounded at 72. The conductor 70 is also connected by the conductor 73 to the movable contact arm 74 controlled by the steering mechanism.

The contact arm 74 is moved to the "right' as indicated by the arrow 75, see Fig. 7, when the steering mechanism is turned to the "right", and the arrow 76 indicates the direction of turning of the contact arm 74 effected upon the turning of the steering mechanism to the "left". The contact 77 is a neutral contact for the contact arm 74 and is connected by the lead 78 to the common bridging contact 14 having two "right" terminals, the upper 15 and lower 16 and also to the two "left" terminals, the upper 17 and the lower 18. The manual switch 12 is biased to its central or neutral position by any suitable means, as the set of retractile springs 79, 80, to normally position the bridging contact 14 in bridging connection with the upper "right" contact 19 and upper "left" contact 23.

It will be observed that the neutral contact 77 of the steering control switch arm 74 is at an appreciable spacing from the respective "right" contact 42 and the "left" contact 65, thereby providing for an initial extent of turning of the steering mechanism to the "right" or the "left" before the contact arm 74 electrically engages either the "right" contact 42 or the "left" contact 65.

Pursuant to the circuit connections shown in the diagram, Fig. 7, and the use of these same for manual pre-setting to indicate the intent of lateral course turning, in advance of actual turning of the steering mechanism, we will assume the manual switch 12 to be in its neutral position, and also the switch arm 74 of the steering switch to be in its neutral position; upon turning the manual switch 12 to the "right" as indicated by the arrow 81, the circuit from the battery 71 is closed through the conductor 70, conductor 73, switch arm 74, neutral contact 77, conductor 78, bridge contact 14 (of the switch arm 12), contact 22, conductor 31, conductor 33, "right" electromagnet 34 and thence through "ground" to the opposite terminal of the battery 71, thereby energizing the "right" electromagnet 34, causing the attraction of its armature 36 and movement of the "right" switch lever 29 and by the bridging contact 28 connecting terminal 27 (connected to conductor 31) with terminal 26, to effect continued energization of the "right" electromagnet 34, as will appear.

Also, by the movement of the "right" contact lever 29, the contact 40 is bridged with the contact 39 by the bridging member 38, connecting the conductor 70 (connected to one side of the battery 71) with the conductors 41, 48, leading to the one or more "right" course indicators 49, 49a, 49b thereby energizing the same.

Upon manual release of the manual lever 12 and return of the same to its neutral position, effected by the springs 79, 80, the circuit through the "right" electromagnet 34 is continued by the closed circuit condition therethrough effected by the bridging of the contacts 26, 27, by the bridging contact 28, conductor 25, contact 19 of the manual switch 10, bridge contact 14 of the manual lever 12, and thence through the neutral conductor 78, neutral contact 77, contact arm 74 to battery 70.

Assuming now that the operator of the vehicle turns the steering mechanism also to the "right", the contact arm 74 is moved to the "right", as indicated by the arrow 75, and after a pre-determined arcuate movement of the steering mechanism and therewith of the switch arm 74, the switch arm 74 engages the contact 42 of the steering switch, whereupon the battery 71 is connected through the conductors 70, 73, contact arm 74, contact 42, and thence through conductors 41, 48 with the one or more "right" indicators. Upon displacement of the contact arm 74 out of engagement with its neutral contact 77, the circuit from the contact arm 74 through its neutral contact 77 and "right" electromagnet 34, as above described, is broken, but the circuit through the one or more "right" indicators 49, 49a, 49b is maintained by the engagement of the contact arm 74 with the contact 42, as above described.

In the event that the manual switch 12 is first moved to the "right", as above indicated, with consequent energization of the "right" electromagnet 34 and lighting of the one or more "right"

course indicators, as above described, and the manual switch 12 then moved to the "left", the circuit through the "right" electromagnet 34 is broken by the withdrawal of the terminal 14 from contact with the upper "right" contact 19, and upon bridging of the upper "left" contact 23 with the lower "left" contact 24 by the bridging contact 14 of the manual lever 12, the circuit through the "left" electromagnet 58 is similarly established, as appears more fully hereinafter, and also the one or more "left" course indicators are energized, also as set forth hereafter.

Assuming the steering mechanism to be substantially in neutral position and manual lever 12 thrown to the "right", but that the operator after releasing the manual lever 12 does not turn to the right but pursues a straightahead course, the movement of the manual lever 12 slightly past neutral position automatically breaks the circuit through the battery 71, the "right" electromagnet 34 and also through the one or more "right" direction signals 49, 49a, 49b, thus cancelling the pre-set indication.

Assuming now that the manual lever 12 has been turned to the "right", but due to change of intention or to traffic conditions or otherwise, the steering mechanism is turned to the "left", the movement of the manual switch 12 to the "right" had pre-set the one or more "right" indicators, as above described, which remain energized upon the return of the manual lever 12 to its neutral position, but upon turning of the steering wheel to the "left" and therewith causing the contact arm 74 to turn to the "left", i. e. in the direction of the arrow 76, Fig. 7, the displacement of the contact arm 74 from its neutral contact 77 breaks the circuit through the "right" electromagnet 34 and through the "right" course signals 49, 49a, 49b and upon engagement of the steering controlled contact arm 74 with the contact 65, the circuit through the battery is established through conductors 70, 73, contact arm 74, contact 65, conductors 64, 67 leading to the one or more "left" directional signals 68, 68a, 68b.

The pre-setting to the "left", i. e. in the direction of the arrow 82 of the manual switch 12 and subsequent turning beyond a predetermined arc of the steering mechanism also to the "left" causes the contact arm 74 to move in the direction of the arrow 76, and the pre-setting of the "left" course signals 68, 68a, 68b, is similarly effected by circuit connection through the "left" electromagnet 58, bridge contact 54 interconnecting contacts 52, 53 to maintain the circut through the battery 71 and the one or more "left" course signals 68, 68a, 68b. Upon the return of the manual switch 12 to its neutral position, and the closing of the circuit directly through the battery and the switch arm 74 and upon turning the steering mechanism beyond a predetermined arc to the left subsequent to the pre-setting of the "left" of the manual lever 12, the circuit is established from the battery directly through the one or more "left" course signals, and the circuit through the "left" electromagnet 58 being broken.

The paths of the circuit for the "left" course signals, for the manual presetting and/or operation of the steering wheel correspond to the paths of the "right" course signals. Also, in the event that the manual lever is thrown to the "left" and the steering turned to the "right", the pre-set "left" indicators are "cancelled" upon turning the steering beyond a predetermined initial turning movement and the "right" indicators energized, similarly as set forth hereinabove, in regard to manual pre-setting and automatic operation effected by the steering.

My invention also provides for the "cancellation" of a manually pre-set indication by operation of the manual lever, as, for example, assuming that the hand lever 12 has been turned to "right" and it is desired to "cancel" such indication, the hand lever is merely turned partially to the "left", namely, to an extent to electrically separate the upper "right" terminal 15 from the upper "right" contact 19, thus interrupting the circuit from the battery to the "right" electromagnet and de-energizing the latter. Such partial movement, it will be noted, does not effect bridging of the lower left terminal 18 with the lower left, short contact 24, and thus does not effect the closure of the circuit through the "left" electro-magnet 58, nor de-energizing of the "left" indicators.

The "right" electro-magnet 34, its pivoted contact lever 29 and associated contacts and terminals, and also the "left" electromagnet 58, its contact lever 46 and associated terminals and contacts are conveniently housed within the housing 11, as is illustrated in Figs. 2, 3 and 4. The contact levers 29, 46 respectively of suitable electrically insulating material, are shown hinged at 30, 46b, respectively, at opposite walls of the closed housing 11. The bridging members 28, 38, of the "right" lever 29, and similarly the bridging members 54, 63 of the lever 46 are in the form of springs, see Fig. 2, and the associated terminals are in the form of studs of metal, suitably insulated, as indicated at 80 from the walls of the housing 11. Binding posts 81 are provided for each contact stud for connection with the proper conductors leading respectively to the terminals of the hand switch 10, usally in the form of a cable 81a, as indicated in Fig. 1, and to the terminals of the lateral course lamps or other indicators, also conveniently in the form of a cable, as indicated at 81b, running to a suitable housing 81c for the rear course indicator lamps, as above set forth.

The housing 11 also conveniently encloses the steering operative switch 43, as appears from Figs. 2, 3 and 4. The switch arm 74 is shown in its neutral position, i. e. in contact with its neutral contact 77. The contact arm 74 is advantageously mounted on a gear 82 and insulated therefrom as indicated at 83, the shaft 84 of the gear 82 being idly mounted in suitable bearings in the outer wall 11a of the housing 11 and intermediate wall 11b. The block 85 of insulation serves as the mounting for the neutral contact 77 and the "right" contact 42 and "left" contact 65.

Meshing with the gear 82, I provide a pinion, pinned to the shaft 86 suitably mounted in the outer wall 11a and intermediate wall 11b, one end 86a of the shaft 86 extending exteriorly of the housing to receive the pulley 87 for control by the steering wheel. Preferably such pulley 87 is helically grooved as indicated in Figs. 2 and 4 to receive a cable 88 wound in the groove, one end 89 of the cable, see Fig. 2, being anchored or otherwise fixedly secured to the periphery of the pulley 87, and the opposite end of the cable connected to a suitable element of the steering wheel to effect a corresponding movement of the switch arm 74 in the proper direction, in association with suitable means for returning the switch arm 74 in the counter direction, as by means of the coiled spring 90, the outer end of which is anchored at 91, see Figs.

2 and 3, and its inner end 92 secured to the periphery of the shaft 86.

In the particular form of my invention illustrated in the drawings, I have shown the free end of the cable 88 attached to the drag link 95, connecting the free end of the rocker arm 96 with the steering knuckles, in which particular embodiment the forward movement of the drag link 95 effects the turning of the steering to the "left", and accordingly upon turning the steering wheel 97 to the "left", thereby correspondingly rotating the stud 98 of the rocker arm 96 in clockwise direction, as viewed in Fig. 1, the cable 88 will be pulled, thereby rotating its grooved pulley 87 and therewith the steering operated switch shaft 86 in counter clockwise direction as viewed in Fig. 3 and thereby also "winding up" the coiled spring 90.

The coiled spring 90 serves to "wind up" the cable 88 on the grooved pulley 87 upon restoring the steering wheel to neutral position and for actuating the steering operated switch shaft 86 upon the steering wheel being turned to the "right". The coiled spring serves also at all times to preclude slack in the cable 88.

The cable form of actuation of my invention enables embodiments of the invention to be of standard manufacture, the variations of steering mechanisms of individual makes and types of cars being compensated for by selecting the proper length of the cable and/or determining the proper location of securement of the end of the cable to the steering mechanism, thereby locating the steering operated switch arm 74 at its neutral or mid position when the steering is in straight-ahead position. The length of the helical groove of the grooved pulley 87 provides for the "paying out" of the cable beyond the neutral position and for the extreme extent of turning of the steering, both to the "right" or the "left".

Specifically, I have illustrated a clamp 100 for securing the free end of the cable 88 at the proper location on the drag link 95 for effecting the neutral position of the steering operated switch arm 74 when the cable is taut.

For standard equipment, the drive connection between the steering wheel and the shaft 86 of the gearing of my steering operated switch mechanism, may be had by direct or by gearing connection with the steering column or by intermediate gearing, the gearing being determined by the gearing ratio between the steering wheel and the arc of turning movement of the vehicle, and the arc of turning of the switch arm 74 of the steering operated switch mechanism.

My invention is also applicable for all other types of self-propelled vehicles, such as bicycles, motorcycles, airplanes, dirigible air ships and other suitable transportation bodies.

In Fig. 7 I have indicated at 101 the connection position of a switch for disconnecting the battery 71 or other source of electrical energy from the electrical circuits of the manually operated and steering operating circuits, to provide for parking the car with the steering turned as desired without consuming the electrical current, or for other purposes.

Such switch 101 is preferably mechanically or otherwise jointly connected with the ignition switch of the automobile or other vehicle, to effect joint closing of the signalling circuit with the ignition circuit and joint breaking of the same upon insertion and turning of the ignition switch key, and of its removal.

Whereas, I have described my invention by reference to specific formations thereof, it will be understood that many changes and modifications may be made without departing from the spirit of the invention.

I claim:—

The combination with a motor vehicle including a steering device and a source of electrical energy, of a switch arm controlled by said steering device, a source of power, a connector for connecting said source of power to the switch arm, a switch contact normally engaging the switch arm in the neutral position of such switch arm, "left" and "right" contacts associated with said switch arm and on either side of the first said contact, "left" and "right" course signals, conductors leading therefrom to the "left" and "right" contacts respectively, a separate switch for manual operation in common for "left" and "right" presetting of the course signals, said manually operable switch being electrically connected to the first said contact, a plurality of pairs of contacts, each pair constituting respectively "left" and "right" contacts, said plurality of pairs of contacts each consisting of an elongated member normally in engagement with the manually operated switch arm when the switch arm is in neutral position and the other contact of each pair of such length as to be engaged by the manually operated switch arm on its movement out of neutral position only when such switch arm is out of engagement with the elongated arm of the other pair, an electromagnetic means associated with each pair of contacts and with the "left" and "right" course signals respectively, a conductor connecting the short contact of each pair with its corresponding electromagnetic means, an armature for each electromagnetic means, an energizing circuit for each electromagnetic means controlled at the contacts of each pair and energized by power from the source of electrical energy, a holding circuit for each electromagnetic means closed upon the energization of the electromagnetic means and maintained closed after the return of the manually operated switch arm to its neutral position, an energizing circuit for the "left" and "right" course signals closed upon energization of the electromagnetic means to set the desired course signal, an energizing circuit for the course signals closed upon movement of the switch arm controlled by the steering device in conjunction with the "left" and "right" contacts and simultaneously breaking the holding circuit upon the removal of the said switch arm from the contact normally associated therewith, whereby the setting of the "left" and "right" course signals is obliterated upon the return of the steering operated switch arm to normal position.

EVERETT W. SWARTWOUT.